United States Patent
Guo et al.

(10) Patent No.: US 7,526,564 B2
(45) Date of Patent: Apr. 28, 2009

(54) HIGH QUALITY STREAMING MULTIMEDIA

(75) Inventors: Katherine Hua Guo, Eatontown, NJ (US); Markus Andreas Hofmann, Tinton Falls, NJ (US); Tze Sing Eugene Ng, Pittsburgh, PA (US); Sanjoy Paul, Marlboro, NJ (US); Hui Zhang, Pittsburgh, PA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 389 days.

(21) Appl. No.: 10/090,110

(22) Filed: Mar. 4, 2002

(65) Prior Publication Data
US 2002/0143852 A1   Oct. 3, 2002

(51) Int. Cl.
*G06F 15/16* (2006.01)
(52) U.S. Cl. .................................. 709/231; 709/235
(58) Field of Classification Search ................. 709/226, 709/231, 235, 227
See application file for complete search history.

(56) References Cited

U.S. PATENT DOCUMENTS

| | | | |
|---|---|---|---|
| 5,341,474 A | 8/1994 | Gelman et al. | |
| 5,371,532 A | 12/1994 | Gelman et al. | |
| 5,508,732 A | 4/1996 | Bottomley et al. | |
| 5,550,577 A | 8/1996 | Verbiest et al. | |
| 5,717,854 A * | 2/1998 | Egawa et al. | 709/219 |

OTHER PUBLICATIONS

M. Hofmann and M. Rohrmuller, "Impact of virtual group structure on multicast performance", 1998, Fourth International COST 237 Workshop, Dec. 15-19, 1997, Lisbon.
S. Sheu, K. A. Hua, and W. Tavanapong, "Chaining: A generalized batching technique for video-on-demand systems", Proc. IEEE Int'l. Conf. on Multimedia Computing and Systems, Ottawa, 1997.
K. A. Hua and S. Sheu, "Skyscraper broadcasting: A new broadcasting scheme for metropolitan video-on-demand systems", Proc. ACM SIGCOMM '97, Cannes, Oct. 1997.

* cited by examiner

*Primary Examiner*—Larry D Donaghue

(57) ABSTRACT

A new architecture and operational techniques for supporting high quality live and on-demand streaming multimedia on a data network. By using Helper machines inside the network as data forwarding, caching, and buffering agents, and by forming meshes among Helper machines, advantages of homogeneous, synchronous multicast transmission and of heterogeneous, asynchronous reception are achieved. The architecture provides essentially transparently support to the receivers for near-zero start-up latency, improved playback quality, improved CR-like operations. These are achieved while reducing network and server load compared to today's multimedia networking techniques.

2 Claims, 6 Drawing Sheets

HIGH QUALITY STREAMING MULTIMEDIA

FIELD OF THE INVENTION

The present invention relates to data networks and, more particularly, data networks including systems and methods for streaming multimedia applications. Still more particularly, the present invention relates to networks including systems and methods for providing multicast transmissions, and for reception at a potentially large number of receiver locations.

BACKGROUND OF THE INVENTION

Today, live and on-demand streaming multimedia objects are generally delivered over the Internet and other data networks via unicast connections. This architecture has many shortcomings, both from the content provider's point of view and the user or recipient's point of view. Thus, the content provider suffers a server load that increases linearly with the number of receivers. Users typically endure high start-up latency and unpredictable playback quality due to network congestion. In addition from an Internet Service Provider's (ISP's) point of view, streaming multimedia under such a unicast architecture poses serious network congestion problems.

One way to partially address concerns of content providers and ISPs is to make use of IP multicast. By batching multiple requests into one multicast session, both server load and network load can be significantly reduced. Unfortunately, this solution does not address the receiver's concerns. This is a direct consequence of a fundamental problem with multicast: In multicast, receivers are assumed to be homogeneous and synchronous. In reality, however, receivers are generally heterogeneous and asynchronous.

SUMMARY OF THE INVENTION

The limitations of the prior art are overcome and a technical advance is achieved in accordance with the present invention as disclosed in illustrative embodiments herein.

Illustrative embodiments of the present invention present a new architecture and operational techniques for supporting high quality live and on-demand streaming multimedia on a data network. By using Helper machines inside the network as data forwarding, caching, and buffering agents, and by dynamically forming meshes among Helper machines, advantages of homogeneous, synchronous multicast transmission and of heterogeneous, asynchronous reception are achieved. In many applications, the architecture provides essentially transparent support to receivers for near-zero start-up latency, improved playback quality, improved VCR-like operations. These are achieved while reducing network and server load compared to today's multimedia networking techniques. In addition, improved quality of service (QoS) is provided in respect of reduced jitter and packet loss. In many applications of the present inventive embodiments, modifications to the client software are not necessary.

BRIEF DESCRIPTION OF THE DRAWING

The present invention will be more fully understood upon a consideration of the following detailed description in light of the attached drawing wherein.

DETAILED DESCRIPTION

Figure 1:
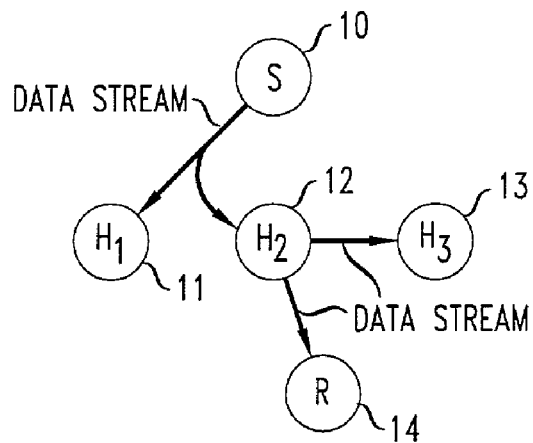
FIG. 1 is shows a simple network with illustrative data flows in accordance with one aspect of the present invention.

To facilitate an understanding of illustrative embodiments of the present invention, it proves advantageous to first consider the network operating environment and areas of application of the present invention, as well as a selection of definitions relating to system architecture and operation.

Applications of Embodiments of the Present Invention

Generally, streaming applications fall into three major categories:

Live broadcasting (e.g. radio stations): This type of application is characterized by a continuous stream of live data. Upon joining a broadcast, receivers are interested in the most recent data and generally will not accept "old" data. However, a delayed playback by a few seconds might be acceptable. In such an environment, multiple clients may request the same data at the same time.

On-demand transmission of long clips (e.g. video on demand): Clients request the playback of long lasting data streams that cannot readily be cached in their entirety. In such an environment, multiple clients may request the same data at different times.

On-demand transmission of short clips (e.g. audio and video animations on web pages): The requested data streams are very short and can be cached entirely. Therefore, the data streams can be handled like regular web objects (e.g. web pages). In such an environment, multiple clients may request the same data at different times.

In accordance with one aspect of the present invention, the boundary between long clips and short clips may be adapted dynamically according to the current resource utilization and available buffer space. While orthogonal solutions could be provided for each of these application areas, it proves advantageous to implement integrated approaches to handling data in these categories. (For example, it proves useful to consider the initial portion of a long clip as a short clip suitable for caching by a caching server.) Such integrated solutions prove beneficial in supporting World Wide Web (Web, or WWW)-oriented continuous media objects where sizes, access patterns, and qualities can vary greatly.

Network Environment

Illustrative embodiments of the present inventive architectures, systems, and methods described herein focus on data streaming in global worldwide networks, such as the Internet. Those skilled in the art will recognize, however, that the present architectures, systems, and methods will be applicable to a wide variety of data networks and applications. Since there are no assumptions about the quality of the underlying network service, operational considerations such as packet loss, jitter and temporary congestion must be treated in accordance with aspects of the present invention. However, while the described architectures, systems and methods will find ready application in best-efforts networks, they will also be useful in networks providing guaranteed quality of service (QoS).

Terms and Definitions

The following terms and definitions are used in the present disclosure.

Continuous media object: A type of data whose transmission has temporal characteristics such that the data may become useless unless the transmission rate is regulated in accordance with predetermined criteria. Transmission can start at any point within the object and can be terminated by the receiver at any time.

Segment: Each continuous media object is divided into fixed-sized ordered segments $s_1$, with $s_0$ representing the initial segment.

Sender: The original owner of the continuous media object. The Sender has the entire object in its repository at all times and is able to serve any client upon request. Its network access bandwidth is a bottleneck and typically limits the number of simultaneous streams it can send. The Sender has multicast capability and seeks to serve as many clients simultaneously as possible.

Receiver: The customer or other user who wishes to playback continuous media objects. Receivers send requests for the objects to senders, but these requests may be intercepted transparently by some machine in the network. Receivers seek zero access latency, highest quality and a low buffering requirement, and may not have multicast capability.

Helper: A helper is one of a plurality of machines in the network that provide certain value-added services. For example, a helper can provide caching services and/or prefetching services. Helper machines selectively cooperate and communicate continuous media objects (or segments of such objects) between and among each other. That is, Helpers understand an object's transmission requirements and can behave, in some respects, like a sender. A helper machine is shared among many senders and receivers and generally does not have all of the resources of a sender.

Proxy helper: The helper to which all requests from a certain receiver will be redirected. A proxy helper can either be manually configured at a client site (e.g. proxy configuration in web browsers), or requests can be transparently redirected by an ISO Layer-4 switch.

Helper mesh: A helper mesh consists of several helpers storing and forwarding segments of a continuous media object. A helper mesh is usually specific to a certain continuous media object. Helpers need not necessarily form a linear chain to support distribution of a certain data stream. Instead, other mesh structures (e.g. trees or loops) are advantageously employed as circumstances dictate. The term helper mesh is used to emphasize that the helpers are loosely coupled in a structure that may change dynamically.

Data stream: A data stream transmits segments of a continuous media object from a source to one or multiple receiving hosts. The source might either be the sender (i.e. the content provider) or a helper. Receiving hosts could be helpers or receivers (i.e. clients). FIG. 1 illustrates various of the terms defined herein. Specifically, FIG. 1 shows an illustrative source 10 delivering a data stream directly to each of helpers $H_1$ (11) and $H_2$ (12). $H_2$ is further shown delivering a data stream to each of helper $H_3$ (13) and receiver R (14). In general, the data stream from $H_2$ to $H_3$ need not be the same as that arriving at receiver 14, but in this example the data stream from $H_2$ to $H_3$ is illustratively part or all of the same continuous streaming object transmitted by the data stream arriving at receiver 14.

Session: A session consists of all data streams transmitting the same continuous media object and getting their data feed from one and only one outgoing stream at the sender. All the data streams shown in FIG. 1, for example, belong to the same session.

Listening Helper: A listening helper for a certain continuous media object is a helper currently not supporting any receiver or helper in receiving segments of this continuous media object. However, the helper does receive "advertisements" and seeks to identify other helpers currently offering support for that continuous media object.

Active Helpers: A helper is said to be active (for a certain continuous media object) if it currently supports any receiver or helper in getting segments of the continuous media object. This implies that the active helper is forwarding data and, therefore, is the source for at least one data stream of the session. We also say that the helper is in session.

Initial Receiver: The initial receiver $R_S(H_I)$ of helper $H_I$ is the receiver that first requested (and is still getting) support from helper $H_I$ in receiving data stream S. In general, a particular helper will have different initial receivers for different data streams. To simplify our terminology, we also allow the initial receiver of a helper to be another helper.

Figure 2:
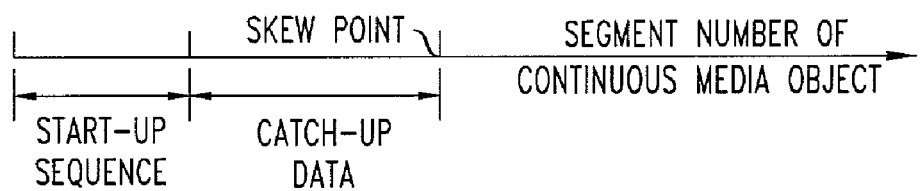
FIG. 2 illustrates some organizational aspects of streaming data as processed in accordance with aspects of illustrative embodiments of the present invention.

Start-up sequence: A number of segments at the beginning of a continuous media object. FIG. 2 shows the position of a start-up sequence. The length of a start-up sequence is not predefined and may vary. The start-up sequence of "hot" continuous media objects is, in accordance with one aspect of the present invention, advantageously cached using classical, static cache servers.

Skew point: If a helper $H_I$ receives a request from helper $H_j$ for a certain continuous media object to be played from the beginning (segment 1), and if the lowest segment number of that continuous media object currently buffered is n, or in the case that $H_I$ does not buffer any data, the segment number of the object currently forwarded by $H_I$ is n, the skew point between $H_I$ and $H_j$ is said to be the beginning of segment n. FIG. 2 illustrates the positioning of a skew point in the sequence of continuous media object segments. The skew point between a helper $H_i$ and a receiver $R_j$ is defined in the same way.

Catch-up data: The segments between the last segment of the start-up sequence and the skew point, as further shown in FIG. 2.

Request Time: The request time $T_S(R_1)$ of receiver $R_1$ is the time at which $R_1$ requests data stream S (from the beginning of the data stream S.) The request time $T_S(H_I)$ of helper $H_I$ is the time at which $H_I$ requests data stream S (from the beginning of the data stream S.) If the request is not from the beginning but from time t seconds into the stream, then t seconds should be subtracted from the actual request time. This adjustment reflects the request time for the beginning of the data stream as if such a request were made.

Initial Request Time (of a helper): The initial request time $IT_S(H_I)$ of helper $H_I$ is the time at which the request from the initial receiver $R_S(H_I)$ for data stream S has arrived at helper $H_I$.

Virtual Request Time: The virtual request time $VT_S(R_1)$ is determined by the current playback point of data stream S at receiver $R_1$. If $R_1$ currently plays the $n^{th}$ second of data stream S, the virtual request time is $VT_S(R_1)=T_{now}-n$ sec. If $R_1$ did not perform any VCR operation, the virtual request time $VT_S(R_1)$ is equal to the request time $T_S(R_1)$. If, for example, $R_1$ played back the first n seconds of data stream S and then did a forward for 60 seconds, its virtual request time is $VT_S(R_1)=T_{now}-(n+60)\sec=T_S(R_1)-60$ sec. That equals the request time of receivers requesting data stream S 60 seconds before receiver $R_1$. As will be clear, a user at a receiver can advantageously exercise normal VCR functionality, such as "fast forward", "rewind", "stop" and the like, in addition to the normal "play" functionality.

Lowest segment number: The lowest segment number $L_S(H_I)$ of helper $H_I$ with respect to data stream S is the number of the first segment in $H_I$'s local buffer for data stream S. If $H_I$ buffers segments $s_{20}$ to $s_{25}$, for example, the lowest segment number is $L_S(H_I)=20$. The lowest segment number $L_S(R_1)$ of receiver $R_1$ is defined in the same way. However, if a receiver or helper does not maintain any buffer, the lowest segment number is the number of the currently played segment (or, currently forwarded segment, respectively).

Temporal distance: The temporal distance between two helpers $H_i$ and $H_j$ with respect to a certain data stream S is defined to be the absolute difference between their lowest segment numbers for S: $\Delta_S(H_i, H_j)=|L_S(H_i)-L_S(H_j)|$. Accordingly, we defin the temporal distance between a helper and a receiver and between two receivers.

Temporal distance (between a helper/receiver and a data stream): The temporal distance $\Delta_S(R_1)$ between a receiver $R_1$ and a data stream S is defined to be the difference between the lowest segment number of $R_1$ and the lowest segment number currently in transmission on data stream S. The temporal distance $\Delta_S(H_i)$ between a helper $H_i$ and data stream S is defined in the same way.

Response time: Time measured at the client/user between requesting a data stream and receiving the first segment of the requested data stream. Response time is a critical parameter because it largely determines user satisfaction.

Service time: Time required to serve an incoming request at a helper or the sender.

Popularity: The Popularity of a continuous media segment is proportional to the access frequency of the segment in a certain time period. These and other terms will be further understood in their use in the following description of illustrative embodiments.

Basic Mechanisms

Streaming architectures in accordance with illustrative embodiments of the present invention support transmission of continuous data streams to multiple receivers, illustratively over best-effort networks. While multicast is very efficient for transmitting data to multiple receivers simultaneously, it fails to support individual receivers requesting the same media object at different times. In the latter case, traditional approaches use multiple streams or batching techniques to serve the receiver set. See, for example, K. A. Hua and S. Sheu, "Skyscraper broadcasting: A new broadcasting scheme for metropolitan video-on-demand systems," *Proc. ACM SIGCOMM '97*, Cannes, France, September 1997.

While multicasting typically increases response time, unicasting increases network load.

To overcome these drawbacks and to further increase quality of streaming transmissions, illustrative embodiments of the present invention advantageously combine three (orthogonal) mechanisms: caching, prefetching and pipelining. A common element in many illustrative embodiments is to make use of ongoing data transmissions to serve new requests for the same data stream. For this purpose, future data for a new receiver is buffered from current data streams when it becomes clear that such data will prove useful in meeting new requests for service. That is, streaming data is advantageously cached at a Helper on demand. Any missing start-up and catch-up data is advantageously obtained directly from the sender or another Helper. Once the catch-up flow has reached the skew point, it can be terminated and the original data transmission can be shared. By such means, a Helper's buffer absorbs the skew. Use of multicast technology can, in some contexts, further improve efficiency. The following sections briefly explain these mechanisms more completely.

Pipelining

Pipelining data streams in accordance with an aspect of the present invention serves to smooth network jitter due to temporarily congested links. Several Helpers $H_I, \ldots, H_n$, are placed into the data path between server and receiver, thus providing additional buffer capacity to dynamically cache segments of a data stream (e.g. video clip). Per definition, the original data source is named $H_0$ and the receiver is named $H_{n+1}$. Each Helper $H_i$, $0<i<n+1$, illustratively allocates a ring buffer to store ti seconds of a clip. As soon as the ring buffer is half filled (after $0.5 \times t_1$ seconds), Helper $H_i$ starts forwarding stored data to the next pipeline element $H_{i+1}$. Besides this, Helper $H_i$ continues to buffer data received from $H_{i-1}$. The time required to fill a pipeline is $$T = \frac{1}{2} \cdot \sum_{i=1}^{n} t_i.$$

A filled pipeline serves to smooth jitter due to temporarily congested links between two pipeline elements.

Caching

In embodiments of the present invention, caching data streams serves at least two purposes. Firstly, caching reduces response time by storing data (e.g. the initial part of a data stream) close to the clients. Secondly, caching reduces network load by allowing multiple clients to access nearby caches instead of requesting data from a far away data source. However, live data streams or long clips cannot generally be cached in their entirety. Therefore, illustrative embodiments of the present invention advantageously employ a two-part caching technique: initial caching buffers the first few seconds of a clip to allow fast service access, while dynamic caching allows sharing of buffer space between multiple recipients of a continuous data stream.

Static Caching

In general, two kinds of data stream caching are advantageously employed. The first kind we call static caching, where the cached data are relatively static—similar in many ways to normal web objects are periodically ejected. Their ejection is controlled by a cache replacement policy such as Least Recently Used (LRU). LRU techniques are described, for example, in Operating Systems Concepts, $4^{th}$ Ed., A. Silbershatz and P. B. Galvin, p. 320. The second kind we call dynamic caching in which cached data are stored in a ring buffer and are spilled out when the buffer is full. Static caching is generally useful for accumulating start-up sequence near the receivers. Advantageously, a late receiver of a stream finds necessary catch-up data from the Helpers. Illustrative embodiments of the present invention seek to maintain as comprehensive a view of statically cached data segments as is practical in particular circumstances and coordinate distribution of segments among the Helpers. Subject limits of available storage and transmission capacity, these embodiments store as few redundant copies of the same segments in close proximity as possible to maximize the possibility of finding all catch-up data locally. In applying the present inventive teachings, those skilled in the art will select the storage and distribution of segments based on the number of different continuous streaming objects, the size of streaming objects, the expected number of requests for each object and the storage and transmission capacities of particular networks. Prior operating experience will act as a guide in tuning algorithms for such storage and distribution.

Initial Caching

Initial caching is a special case of static caching. To reduce response time, the start-up sequence of data streams are advantageously cached like regular cache objects (e.g. web pages). Well-known caching strategies are then applied by defining hot, warm, and cold clips according to their popularity parameter. The length of the initial part to be cached advantageously depends on the "distance" to the original data source (or the next Helper). The playback of the initial part allows enough time to fetch catch-up data from the sender or a nearby Helper. In the case of pipelining, the initial playback time must be sufficient to fill the pipeline.

Dynamic Caching

Because long continuous data objects cannot usually be cached in their entirety, dynamic caching buffers segments of a data stream "on the fly." For this purpose, Helpers are introduced within the network that temporarily buffer segments of a continuous media object for later forwarding. For example, if receiver $R_1$ is currently receiving a continuous media objects from a helper H, and if a nearby receiver $R_2$ requests the same object 5 minutes after $R_1$, it is sufficient to dynamically buffer 5 minutes of data at the Helper H. Instead of transmitting all the data again directly from the sender, receiver $R_2$ will easily be served by forwarding buffered data from the Helper H. This approach is advantageously extended recursively to build a mesh of Helpers. The dynamic configuration of Helper meshes is described in more detail below.

Prefetching

Prefetching is based on a prediction of future user requests. This technique seeks to determine which data a user will access next so that it can start downloading the data in advance. Prefetching is most effective when needed data can be downloaded in advance to a buffer serving a request. The efficiency of prefetching depends, of course, on the quality of predictions.

Fortunately, accessing continuous media objects is highly predictable. A user requesting the start-up segments of a continuous media object is very likely to be interested in the following segments as well (unless he quits or performs any other VCR operations). It will be recognized by those skilled in the art that, in the caching operations discussed above, prefetching is implicitly involved in such caching. That is, segments of past data cached at a Helper at its playback point is actually future data from a future requester's perspective. So, in a Helper mesh, upstream Helper's caches serve as prefetched data for a downstream Helper. In particular cases, it is possible to set up an explicit pipeline of prefetch buffers to form a large prefetch buffer in the network.

Architectural Overview

Figure 3:
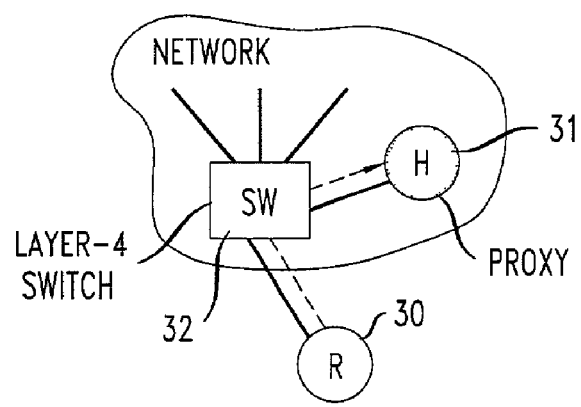
FIG. 3 illustrates redirection of a request by a receiving location in an illustrative network using helper nodes.

A receiver interested in getting a certain continuous media object simply signals its request in a message directed to the owner of the continuous media object (e.g. by clicking on a web link). The request is advantageously redirected to the receiver's proxy helper. FIG. 3 shows this redirection of a request from receiver 30 to Helper 31 being accomplished transparently by an illustrative layer-4 network switch 32. Alternatively, the redirection can be accomplished by configuring a proxy in the client's software.

On receiving the request, Hi increases the popularity of the requested continuous media object. (Hi also provides for "aging" of the popularity value, i. e., for decreasing the popularity of an object with time, but, in the interest of simplicity, such aging will not be included in the present discussion.) If the popularity of any continuous media object exceeds a certain threshold, $H_I$ will start/continue to statically cache its start-up sequence.

In addition, Helper $H_I$ tries to find an appropriate Helper willing to support the new receiver. The mechanisms and the criteria for Helper selection will be described further below. For now it is sufficient to note that there is a trade-off in this selection between multiple metrics, such as network load, processing load, buffer requirements, etc. Generally, network distance towards the selected Helper should be lower than that to the sender, though a need to avoid increased load on the sender can override this rule in particular cases. If no appropriate Helper is found, $H_I$ (e.g., Helper 31 in FIG. 3) will forward the request for media object O directly to the sender. In addition, $H_I$ will include media object O in its advertisements if it has enough buffer space available to support potential new receivers. On receiving segments of media object O, Helper $H_I$ will forward them to the requesting Receiver/Helper.

Figure 4:
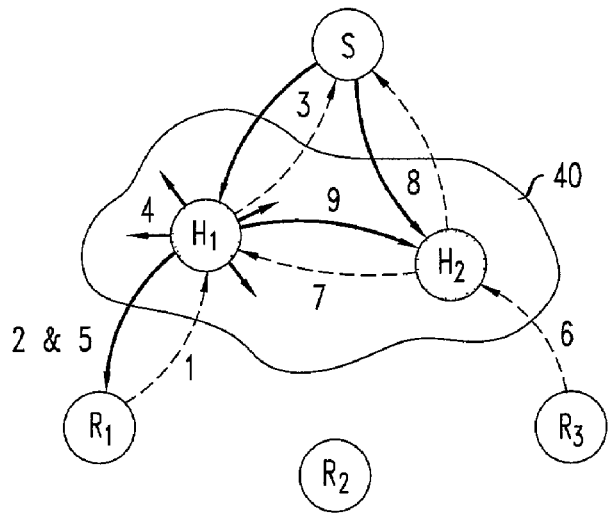
FIG. 4 shows illustrative decision flows in a network in accordance with an illustrative embodiment of the present invention.

The following example illustrates a typical streaming operations in accordance with an illustrative embodiment of the present invention. As shown in FIG. 4, a portion of a network 40 includes Helpers $H_I$ and $H_2$ available to serve receivers $R_1$, $R_2$, and $R_3$, and video server S. Due to former user requests, video clip O has been classified as "hot," so Helpers $H_I$ and $H_2$ currently cache its start-up sequence (static caching).

When receiver $R_1$ requests video clip O at time $t_1$ its request is either directly addressed or transparently redirected to its proxy helper $H_I$ (transmission "1" in FIG. 4). Assume at time $t_1'$, $H_I$ receives $R_1$'s request. While transmitting the start-up sequence of clip O to receiver $R_1$ ("2" in FIG. 4), Helper $H_I$ requests the follow-on data (that is, the data immediately following the start-up sequence) from the server S ("3" in FIG. 4).

Substantially simultaneously, $H_I$ starts advertising to other Helpers in network 40 that it is willing to act as a Helper for clip O (transmissions "4" in FIG. 4). A buffer need not always be allocated immediately at $H_I$. However, it sometimes proves useful to allocate a ring buffer for dynamic caching when, as in the present example, video clip O has been classified to be "hot" in the expectation that another Helper or Receiver will also request clip O later on. The advertisements from $H_I$ are advantageously addressed to a specific multicast group ("the announcement group"). While such advertisements are sent periodically, their scope varies according to a predetermined algorithm, such as the ERA algorithm described below.

When all the cached start-up segments have been sent to $R_1$, Helper $H_I$ starts forwarding the follow-on data ("5" in FIG. 4).

Further in accordance with the present example, receiver $R_3$ next requests video clip O at time $t_2$. Its request is either directly addressed or transparently redirected to the proxy Helper $H_2$ ("6" in FIG. 4). If $H_2$ has recently received an advertisement for clip O from another Helper, it will try to connect to an existing mesh. In the present example, $H_2$ has 2 choices. It can either join the (multicast) stream originating at the Sender, or a new stream from $H_I$ to $H_2$ can be set up. We assume that $H_2$ has recently received an advertisement for clip O from $H_I$, and that it decides to send a request for clip O to $H_I$ ("7" in FIG. 4). On receiving this request at time $t'_2$, $H_I$ dynamically allocates a (ring) buffer to cache $\Delta = t'_2 - t'_1 + \epsilon$ seconds of clip O. It immediately starts buffering data received for and forwarded to $R_1$ in the (ring) buffer. (The extra amount of buffer space corresponding to $\epsilon$ seconds is added to absorb network delays and other random factors.)

In the meantime, $H_2$ gets the start-up sequence of the clip either from a caching server and/or directly from the original data source S ("8" in FIG. 4). If the start-up sequence cached by a caching server is shorter than $t'_2 - t'_1 + \epsilon$ seconds, it is necessary to switch between data streams originated at the caching server with the start-up sequence and the original data source which offers the catch-up data. (To simplify the scheme, helpers always request the catch-up data sequence from the original sender. Because catch-up sequences are relatively short compared to the entire clip, and helpers request them at different times depending on the distribution of user requests, this design decision will not significantly increase server load. On the other hand, by going to the server directly, helpers skip the process of finding the appropriate helper with catch-up data, which shortens the time required to receive catch-up data in some cases.) At time $t''_2 = t'_2 + \Delta$, data stored in the ring buffer will be delivered to $H_2$ ("9" in FIG. 4) and transmission from the original data source (or a caching server) will be stopped. Now, we have a Helper mesh consisting of $H_I$ and $H_2$ (Similar process happens when $R_2$ requests the same clip.)

On receiving data, $H_2$ itself might start to send advertisements indicating its willingness to act as a Helper for clip O. However, $H_I$ keeps on sending advertisements, too. This allows a new Helper connecting to the mesh to select amongst multiple mesh elements.

State Distribution

As described above, improved delivery of continuous streaming multimedia objects in accordance with illustrative embodiments of the present invention is achieved using a mesh of Helpers that are set up dynamically according to current access patterns and network characteristics.

A first approach to mesh establishment employs a centralized authority having knowledge about existing Helpers, their distance from each other, and their current status. Having such a global view of the Helper set allows the finding of optimal meshes. However, in some networks (or for some states of networks) it proves difficult to keep the global view up-to-date. Additionally, special mechanisms are often necessary for fault tolerance in such circumstances. Signaling message overhead can prove to be quite high in some networks or for some states in applying such global view techniques.

In a second, decentralized, approach, Helpers gather information about existing meshes and locally select meshes and Helpers to which they will connect. While this approach does not always find the best solution, it proves less complex, generally scales better than a centralized approach and proves more stable for a variety of operating circumstances and environments. The following description therefore employs a decentralized method for distributing state information of existing Helpers, thereby allowing interested hosts to select among suitable Helpers. This selection is advantageously based on local appropriateness measures and considers several metrics (e.g. temporal distance, network distance, and overall buffer capacity). This method allows both static installation of Helpers at strategic locations within the network and dynamic configuration of Helpers at arbitrary end-systems.

Sending Advertisements

State Distribution allows Helpers to capture information on the status of active helpers. As will become apparent to those skilled in the art, the presently described state distribution method does not require complete knowledge about the status of all active Helpers. Accordingly, in some applications of the present invention it proves convenient to use a highly distributed advertisement mechanism based on soft-states rather than explicit signaling necessary to maintain hard-states.

Figure 5:
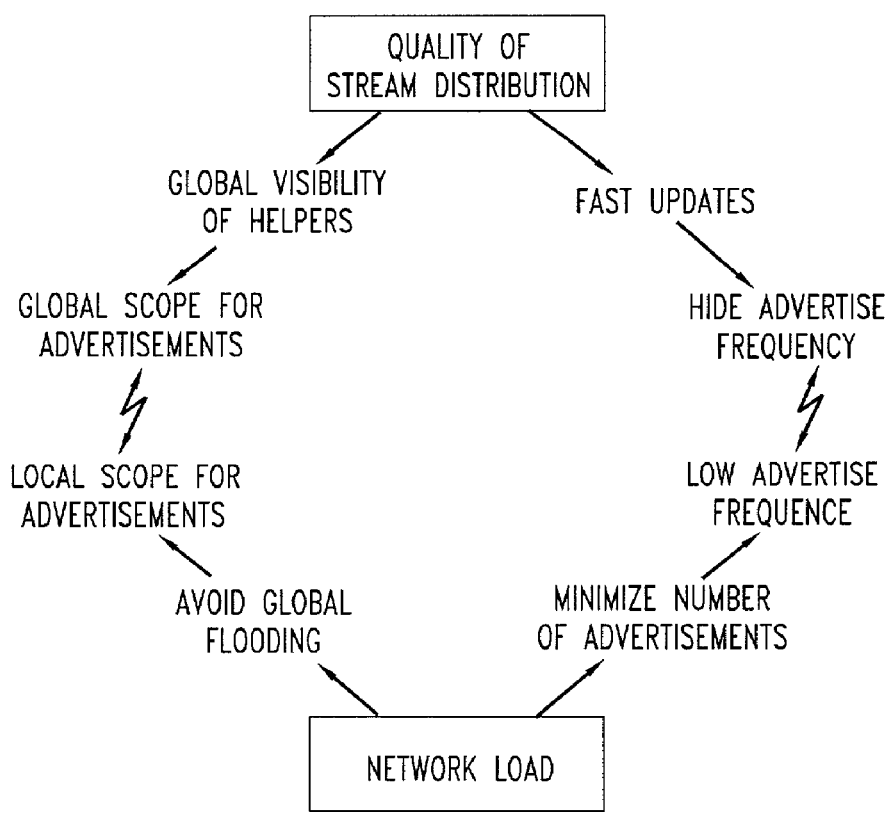
FIG. 5 shows some conflicting requirements for state distribution in networks in accordance with illustrative embodiments of the present invention.

In defining a mechanism for state distribution, it proves useful to pursue the joint goals of keeping network load as low as possible while maintaining the quality of state distribution as high as possible. In accordance with one measure of quality in state distribution Helpers get an up-to-date and (almost) complete view on existing Helper meshes. However, high quality state distribution and low network load lead to conflicting requirements, as shown in FIG. 5. As summarized in FIG. 5, achieving good quality in state distribution requires that updates be sent as soon as there are any changes in current Helper meshes. In a software-based system using periodic advertisements, this requirement implies frequent sending of advertise messages.

In addition to frequency of advertisements, quality of state distribution can also depend on the visibility of Helpers—as further shown in FIG. 5. The establishment of global Helper meshes, for example, requires global visibility of Helpers. In practical terms, the visibility of Helpers mainly depends on the scope of their advertise messages. With a larger scope (e.g. higher time to live, ttl value) for outgoing advertise messages, more Receivers are able to identify a Helper. From this point of view, using global scope for advertisements seems to be preferable. However, from a network traffic point of view, global flooding of advertisements is not a preferred solution. Rather, it is preferred that advertisements be restricted to a local scope, thereby minimizing the (global) network load. In addition, advertisements should be sent with low frequency to minimize control overhead.

New Helpers are mainly interested in getting support from nearby Helpers that are in session and whose network distance as well as temporal distance is relatively small. (While these distance metrics are nominally given equal weight in these considerations, in appropriate cases one might prove more important than the other. Selection strategies will then correspondingly weight these metrics to reflect the particular circumstances.) Therefore, it proves desirable in many embodiments of the present invention that Helpers receive advertisements from nearby Helpers (in respect to network and temporal distance) more frequently than from more remote Receivers. Emphasis on such local Helpers allows a Helper to quickly find an appropriate Helper while avoiding the overhead associated with global advertisements.

An approach using a so-called *Expanded Ring Advertisement* (ERA) tries to achieve these goals in respect of network distance. See further, M. Hofmann and M. Rohrmuller, "Impact of virtual group structure on multicast performance," 1998. Fourth International COST 237 Workshop, Dec. 15-19, 1997, Lisbon, Portugal, Ed.: A. Danthine, C. Diot: *From Multimedia Services to Network Services, Lecture Notes in Computer Science*, No. 1356, Page 165-180, Springer Verlag, 1997. In the use of ERA, temporal distance is not considered. Rather, according to the ERA algorithm, Helpers send their advertisements with dynamically changing TTL values given in Table I and illustrated in FIG. 6.

Figure 6:
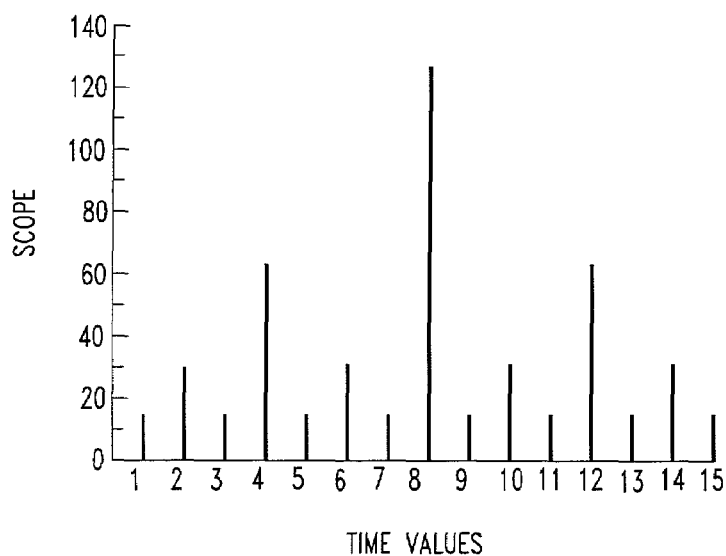
FIG. 6 illustrates timing for illustrative scoping functions employed at Helpers in accordance with embodiments of the present invention.
Figure 7:
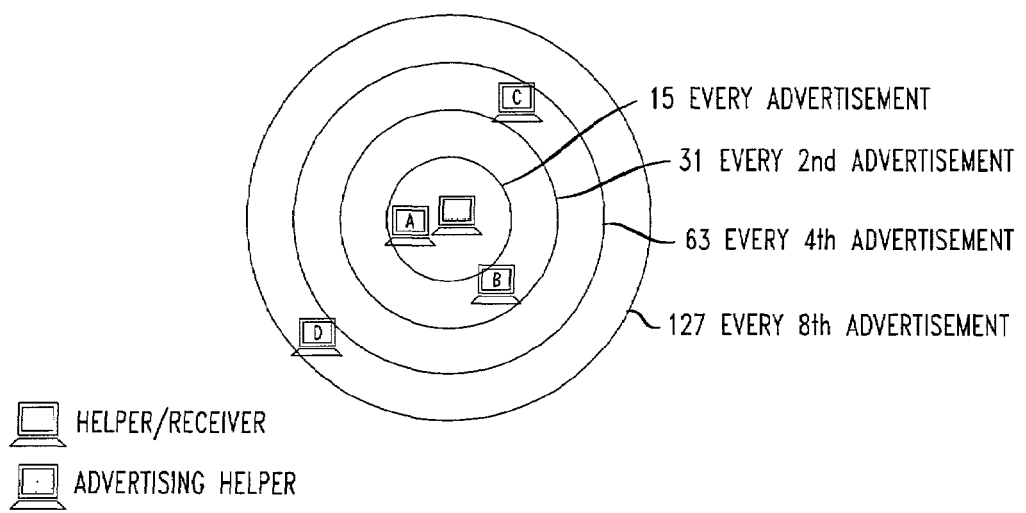
FIG. 7 illustrates a variety of illustrative scoping areas for use in embodiments of the present invention.

As listed in Table 1, and shown graphically in FIG. 6, a first advertisement message is sent with a scope of 15 (scope 'local'), the second one with a value of 31 (scope 'regional'), etc. The consequences of this scheme are illustrated in FIG. 7. That figure shows that listening Helpers within a scope of 15 (e.g. Helper A in FIG. 7) will get each of the advertise messages (supposing there are no packet losses). If the distance between the host and an active Helper is between 16 and 31 (e.g. Helper B in FIG. 7), it will receive every second advertisement. This scheme continues in a way that every $16^{th}$ advertise message will be distributed worldwide. The Expanded Ring Advertisement ensures that the frequency of advertise messages exponentially decreases with increasing scope. Therefore, the scheme reduces network load while allowing short reaction times upon changes within a local scope. However, it still ensures global visibility of Helpers in a larger time-scale. Helpers/ Receivers are still able to identify Helpers in a far distance and to select them as $2^{nd}$, $3^{rd}$, $4^{th}$, ... choice. The Expanded Ring Advertisement approach can also be used to estimate the number of hops between Helpers without having access to raw IP sockets.

Additional metrics, such as Helper load, benchmarks, pricing, etc., may be included, as well. All of these values are advantageously updated immediately before sending a new advertisement.

Each potential Helper (and, optionally, Receiver) listens to the well-known advertise multicast address to receive advertisements from other Helpers. That is, all Helpers listen for a multicast on a pre-defined address to receive advertisements. On receiving an advertise message at a particular Helper, a local table storing the status of existing Helpers is updated. Therefore, each potential Helper (and, optionally, Receiver) knows about Helpers currently offering support for certain data streams. Each Helper also maintains a table entry indicating its own status.

Helper Selection

Figure 8:
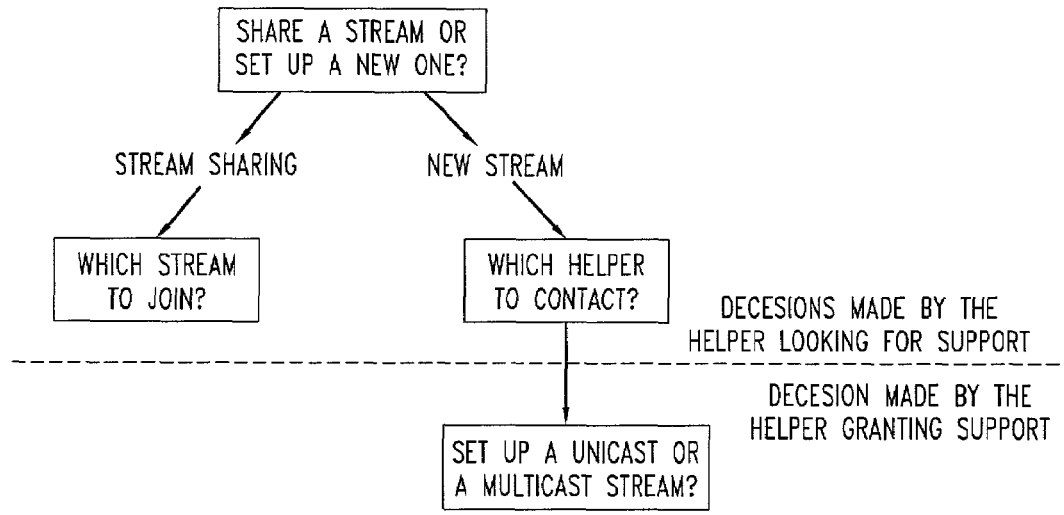
FIG. 8 is a flowchart illustrating aspects of processing a request in accordance with illustrative embodiments of the present invention.

On receiving a request for a continuous media object, a Helper makes a decision as to the location from which the requested data will be obtained. In the simplest case, a Helper always requests the data directly from the Sender. However, to make use of sharing of data streams as often as possible to reduce server and network load, there are two choices from which a Helper must select. The Helper can request the establishment of a new data stream, or it can share an existing multicast stream. After the decision is made, a Helper next must determine a preferred multicast stream to join to, or determine the best Helper to ask for help in establishing a new stream. In the latter case, the Helper/Sender setting up a new stream also must decide whether the new stream should be unicast or multicast. The steps necessary to get the requested data are shown in FIG. 8.

In practice, a Helper first determines the best solutions for both setting up a new stream and sharing an existing multicast stream. Afterwards, it compares both of them and chooses the better one. However, having the notion of "best" and "better" requires a proper definition of performance indices to assess

TABLE 1

TTL values used to send advertisements

| Interval No. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| TTL | 15 | 31 | 15 | 63 | 15 | 31 | 15 | 127 | 15 | 31 | 15 | 63 | 15 | 31 | 15 | 254 | 15 | 31 |

Advertise Messages

As noted above, each Helper periodically sends so-called advertise messages to indicate its ability to support certain data streams. Advertise messages typically contain one or more of the following types of information:

the overall free buffer space B currently available at a Helper, the identifiers for all continuous media objects $O_i$ currently a Helper is in session of, the rate $r_1$ for all streams currently a Helper is in session of, the number of the last segment forwarded by the Helper for all streams currently a Helper is in session of the set of statically cached segments $\{(s_{j,i}, s_{k,i}), (s_{m,t}, s_{n,i})...\}$ of all streams a Helper is in session of, or maybe just the difference from the previous advertisement, the source machines of all streams a Helper is in session of, including the protocols used by such streams, to facilitate joining of a multicast group or bypassing a Helper.

the current request arrival rate $\lambda$ and the local request service rate u at a helper (both in requests per seconds).

different solutions. The following section introduces illustrative performance indices that prove useful to the Helper in making a selection.

Performance Indices

Many different goals and criteria may be used in making Helper selection decisions, depending largely on the point of view of the decision maker. Thus, while a network provider may be mainly interested in optimizing resource utilization, a client often seeks immediate access to a requested service. These and other often-competing goals are reflected by different performance indices, such as network load, buffer requirements, or service time. In a practical application considering all performance indices for Helper selection can rapidly cause complexity to outstrip processing capacity and computing time. Accordingly, it has proven useful to define a subset of useful indices and, based on prevailing circumstances to select a heuristic that yields a near optimal solution with reasonable complexity. In particular, it proves valuable to consider the following performance indices:

Network load: The network load is given by the number of bytes that are transmitted per time unit. It is desirable to minimize the network load in order to reduce congestion probability. More specifically, it proves advantageous to consider two types of network load:

Aggregate network load: The aggregate network load relates to the added load of all links in the network, regardless of the distribution of per-link load. Minimizing the aggregate network load improves overall throughput of a network. However, it might result in a concentration of data traffic on particular links, thus increasing congestion probability on these links.

Individual network load: Individual network load relates to load on a single link in the network. Therefore, minimizing the individual network load means to minimize the load on each single link (or, more precisely, to minimize, in accordance with one illustrative embodiment, the maximum of all link loads). The goal is to fairly distribute network load to all links in the network, thus, reducing congestion probability. In so distributing load it usually is necessary to consider the bandwidth of each link.

Buffer requirements: This index describes the buffer size required for a single session. Lower buffer requirements, allow more sessions to be supported by a network. Again, two different types of buffer are advantageously differentiated:

Aggregate buffer: The aggregate buffer includes the local buffers of all active Helpers currently in session.

Individual buffer: This index describes the buffer requirements at a single Helper.

Service time: This index describes the time required to serve a request at a Helper or at the sender. Given the processing power at the helper/server, service time is affected by request arrival rate, and the nature of the requests. It does not include propagation or transmission delay. This parameter is essential to achieve fair load balancing among helpers.

In practice, the primary performance indices described above are identified with parameters shown in Table 2. Using these parameters allows a relatively simple and less complex approximation of the performance indices.

TABLE 2

Parameters used in approximating performance indices

| | aggregate | Individual |
|---|---|---|
| Network load | hop count | number of outgoing data streams |
| Buffer requirements | — | buffer at a single Helper |
| Service time | | request arrival rate and service rate |

As with requirements for state distribution described above, performance indices often reflected in Table 2 often compete with each other. The aggregate buffer requirement, for example, can be minimized by setting up separate data streams from the Sender to each receiver. However, this approach results in a dramatic increase of network load. Even aggregate and individual performance indices may conflict with each other (e.g. aggregate buffer requirement and individual buffer requirement). An algorithm for Helper Selection must therefore weigh the several important parameters to find an appropriate trade-off. A useful algorithm for implementing such trade-offs is presented in the following sections in the course of discussing both solutions (new-stream and sharing) for obtaining a requested continuous media object.

Setting Up a New Stream

Figure 9A:
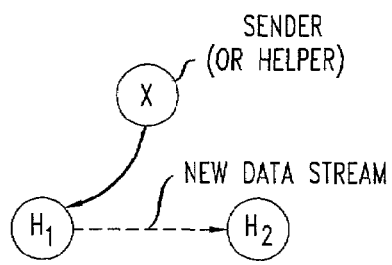
FIG. 9 illustrates some possible choices involved in stream setup in accordance with one aspect of the present invention.
Figure 9B:
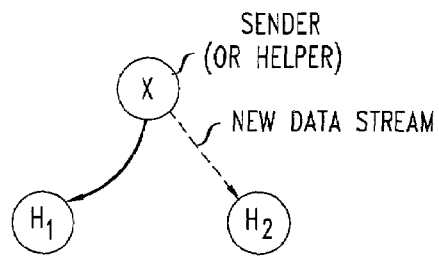

There are several ways to transmit a continuous media object to a requesting Helper $H_i$. One of them is the establishment of a new data stream ending at $H_i$ and originating either at the Sender or another active Helper. In considering pipelining, the stream source could also be a listening Helper. As illustrated in FIGS. 9A and 9B, there can be multiple potential data stream sources; it is important to choose the most appropriate one.

The costs associated with setting up a new stream depend mainly on the temporal and spatial distance between the source and the receiving Helper. While the temporal distance directly corresponds to the buffer requirements, spatial distance relates to the network load caused by the new data stream.

Buffer Requirements

The buffer requirements for setting up a new data stream mainly depend on the temporal distance between Helper $H_i$ asking for support and Helper $H_j$ potentially forwarding data to $H_i$. Besides the temporal distance, the current buffer utilization at $H_j$ should also be considered.

The following example illustrates the calculation of buffer requirements: A Helper $H_i$ is interested in setting up a new data stream which originates at Helper $H_j$. $H_j$ already is in session and currently buffers $b_S(H_j)$ successive segments of the requested continuous media object. It is assumed that $H_j$ currently receives segments of the requested media object on a single data stream S only. If $H_j$ receives multiple data streams transmitting the same media object, the evaluation is done for each of them separately.

Figure 10:
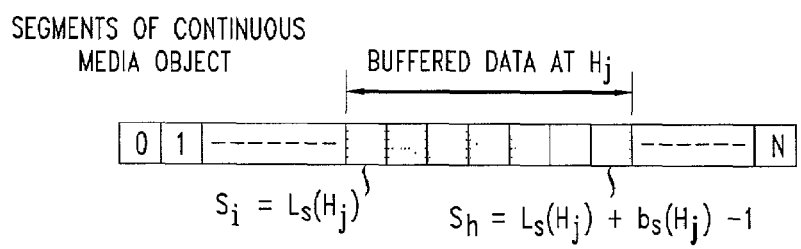
FIG. 10 shows a portion of a continuous media object, for illustrating certain buffer requirements for illustrative embodiments of the present invention.

FIG. 10 illustrates the currently buffered segments of the requested media object at Helper $H_j$. The lowest segment number is $L_S(H_j)$ and the following $b_S(H_j)$ segments are currently buffered (cross-hatched segments in FIG. 10). For simplicity, we substitute $s_l = L_S(H_j)$ and $s_h = L_S(H_j) + b_S(H_j) - 1$ in the sequel. In addition, the requ number will be named $s_{req} = L_S(H_i)$. The additional buffer $b_S(H_j, H_i)$ required to set up a new data stream forwarding segments from $H_j$ to $H_i$ can now be calculated as:

$$b_S(H_j, H_i) = \begin{cases} (s_l - s_{req}) \cdot \text{seg\_len} & : s_{req} < s_l \\ 0 & : s_l \le s_{req} \le s_h \\ \infty & : s_h < s_{req} \end{cases}$$

where seg-len is the length of segments in bytes. Using the notion of temporal distance, the additional buffer will be:

$$b_S(H_j, H_i) = \begin{cases} \Delta_S(H_j, H_i) \cdot \text{seg\_len} & : s_{req} < s_l \\ 0 & : s_l \le s_{req} \le s_h \\ \infty & : s_h < s_{req} \end{cases}$$

The calculation of buffer requirements is explained below for each of the three cases.

Figure 11:
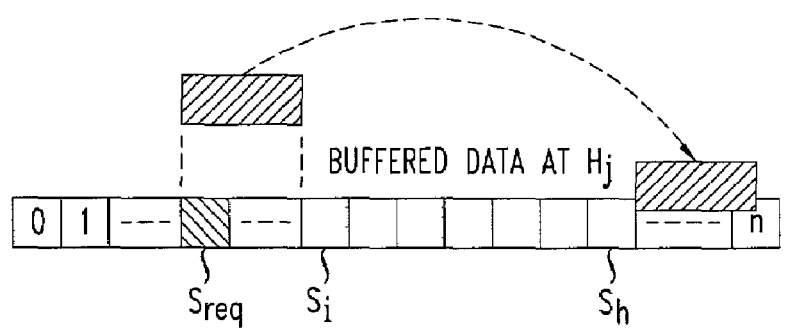
FIG. 11 illustrates buffer operations involved in buffer operations for processing illustrative requests in some embodiments of the present invention.

Requesting old data ($s_{req} < s_l$): In the first case, Helper $H_i$ requests a segment that is no longer stored in the buffer of $H_j$. The first segment that can be forwarded by $H_j$ is segment number $s_l$. Given that all the additional buffer is allocated at $H_j$, segment number $s_l$ must not be removed from the buffer until it has been forwarded to $H_i$. This will be right after receiving $\Delta_S(H_j, H_i) = s_l - s_{req}$ additional segments, thus, requiring $\Delta_S$ ($H_j$, $H_l$) seg-len more buffer. This is illustrated in FIG. 11.

Exactly the same amount of buffer will be required if all of the additional buffer is allocated at $H_l$ or if it is distributed between $H_l$ and $H_j$.

Requesting buffered data ($s_l \leq s_{req} \leq s_h$): In the second case, the segment requested by $H_l$ is still available in the buffer of $H_j$. It will simply be forwarded, thus not requiring any additional buffer space.

Requesting future data ($s_h < s_{req}$): In the third case, $H_i$ requests a segment that has not yet been received by $H_j$. Therefore, $H_j$ is not able to provide any support and $H_l$ has to get the required data from somewhere else. This is indicated by infinte buffer requirements.

It is generally not sufficient to merely consider the additional buffer requirements in assessing the appropriateness of different Helpers. Instead, available buffer space at each Helper should also be taken into account. For example, suppose there are two active Helpers $H_l$ and $H_2$ with temporal distances $\Delta_S$ ($H_3$, $H_l$)=10 and $\Delta_S$ ($H_3$, $H_2$) respectively, to a new Helper $H_3$. We further assume that neither $H_l$ nor $H_2$ have allocated any buffer. Obviously, overall buffer requirements will be lower if a new data stream originating at $H_2$ is set up. However, it might be the case that $H_l$ a large supply of free buffer available, while $H_2$ is short on available buffer capacity. In this case, it will generally be preferable to set up a new data stream from $H_l$ to $H_3$ and to allocate the additional buffer at $H_l$. While this alternative requires more overall buffer, it achieves a better distribution of global buffer.

In order to fairly distribute the burden of providing buffer space, we also consider the available buffer $b_1$ at each Helper $H_l$. The normalized buffer requirement $B_s$ ($H_i$,$H_j$), defined as $$B_S(H_i, H_j) = \frac{b_S(H_i, H_j)}{b_i + b_j}$$

sets both metrics into relation and is a preferred metric used in many applications to assess additional buffer requirements.

Network Load

The network costs for setting up a new data stream mainly depend on the spatial distance between Helper $H_i$ asking for support and Helper $H_j$ potentially forwarding data to $H_l$. In general, network costs (and, correspondingly, aggregate network load) increase with spatial distance between source and destination. However, exact calculation of aggregate network load requires knowledge of network topology and Helper locations. Without such knowledge, additional aggregate network load can only be estimated. For this purpose, the state distribution protocol integrates a mechanism to estimate the network distance between two Helpers. This mechanism is based on multicast scoping and allows classification of Helpers into four different classes (see Table 3).

For example, Helper $H_l$ classifies another Helper $H_j$ as regional, if it receives multicast packets from $H_j$ with a scope of 16 or greater, but no packets

TABLE 3

| class | ttl (scope) | load factor (N ($H_i$, $N_j$)) |
|---|---|---|
| local | 0-15 | 1 |
| regional | 16-31 | 2 |
| national | 32-63 | 3 |
| global | 64-255 | 4 | with a scope of 15 or smaller. Accordingly, $H_l$ classifies Helpers within a scope of 32 to 63 national, and so forth. The corresponding network load factors are a measure for the additional network load when setting up a new data stream with $H_j$ as data source.

Summarizing, the network load factor for a potential origin $H_j$ of a new data stream toward Hi is given by $$N(H_i, H_j) = \begin{cases} 1: & H_j \text{ within a scope of } 0\text{-}15 \\ 2: & H_j \text{ within a scope of } 16\text{-}31 \\ 3: & H_j \text{ within a scope of } 32\text{-}63 \\ 4: & H_j \text{ within a scope of } 64\text{-}255 \end{cases}$$

This factor is used as a measure for the additional network load.

Service Time

In order to set up a new data stream, a corresponding request has to be sent to and to be processed by the selected helper or by the sender. Queuing and processing of the request are associated with a delay, the so-called service time. From the requesting helper's point of view, it is preferable to select the helper or the sender with the lowest service time. For this purpose, advertisements contain information that allows helpers to calculate the currently expected service time of remote helpers and to select an appropriate one. Including the service time into the selection process also ensures fair load balancing among all the helpers.

The service time of a helper or the sender is calculated using a M/M/1/K queuing model to which requests arrive with Poisson arrival rate. In this model, the service time at the helper or the sender is exponentially distributed. There is one processing unit and the maximum queue space is K For our purposes, the maximum queue space K is globally defined for all hosts and specifies the maximum number of simultaneous connections that a helper or the sender can handle. If the number of currently supported connections is more than K, then new requests will be declined.

Helpers and the sender monitor their current request arrival rate $\lambda$ and their local request service rate $\mu$ (both in requests per seconds). These numbers are included in outgoing advertisements and, therefore, are accessible by other Helpers. Using Little's Law [?], other helpers can now calculate the average service time $S(H_l)$ of helper $H_l$ to $$S(H_i) = \frac{1}{\lambda}\left(\frac{\rho}{1-\rho}\right)\left[1 - \frac{(K+1)\rho^K(1-\rho)}{1-\rho^{K+1}}\right], \rho = \frac{\lambda}{\mu}$$

Note that the M/M/1/K queuing model used in our calculation can be replaced by any other model at any time in order to comply with different access patterns.

Sharing an Existing Stream

As an alternative to setting up a new data stream, Helper $H_l$ can also share an existing multicast stream currently transmitting the required media object. For this purpose, $H_l$ simply joins the multicast transmission originating at another Helper $H_j$ or the Sender. There are several costs associated with sharing an existing stream, each of them being explained in the following subsections.

Buffer Requirements

Figure 12:
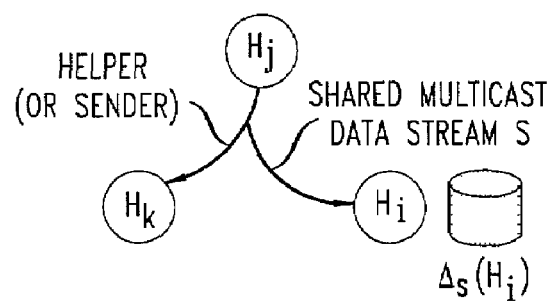
FIG. 12 illustrates sharing of a multicast data stream.

When sharing an existing multicast stream S, Helper $H_i$ must provide sufficient buffer to absorb the temporal distance between itself and data stream S. Segments arriving on stream S must be stored until playback or forwarding. Therefore, $H_i$ has to allocate sufficient buffer to store at least $\Delta_S(H_i)$ segments, as shown in FIG. 12.

Helper $H_i$ knows about existing multicast transmissions and their assigned multicast addresses by evaluating received advertise messages. Besides the multicast address and a media object identifier, advertise messages from a Helper $H_j$ also contain the following values for each advertised stream S:

$r_o$=playback rate for the transmitted media object O in [segments/sec]

Figure 13:
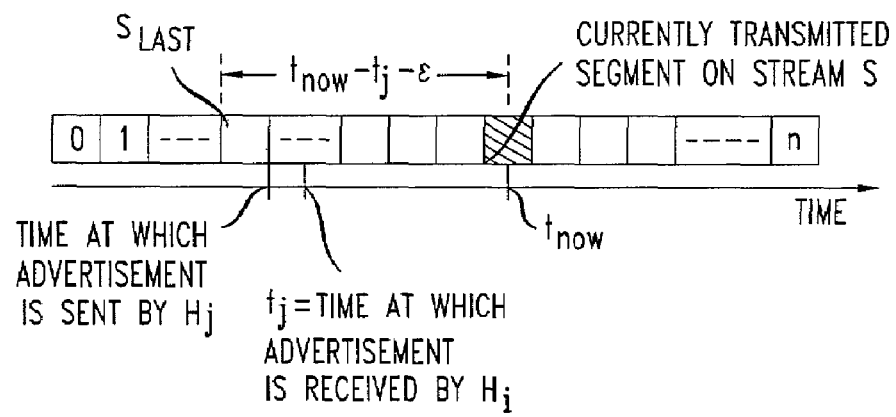
FIG. 13 illustrates timing operations for a currently transmitted segment of a continuous streaming object in accordance with an aspect of the present invention.

$s_{last}$=number of last segment forwarded by $H_j$ on stream S before sending the advertise message Helper $H_i$ uses these values to determine the segment number $s_{now}$ currently in transmission on stream S. While the exact segment number cannot be determined without globally synchronized clocks (or by temporarily joining the multicast group), it can be estimated to $s_{now}=r_o \cdot (t_{now} r_o - t_1 - \epsilon) + s_{last}$, with $t_{now}$=local system time $t_j$=local system time at which last advertisement from $H_j$ was received As illustrated in FIG. 13, the value of $\epsilon$ corresponds to the transfer delay of advertisements and can usually be disregarded (depending on advertise frequency, segment length, and playback rate).

Finally, the buffer space required to absorb the temporal distance and to join multicast stream S can be estimated to $$b_S(H_i) \begin{cases} s_{now} - s_{req} : & s_{req} \leq s_{now} \\ \infty : & s_{req} > s_{now} \end{cases}$$

with $s_{req}$ being the requested segment number.

In order to compare these buffer requirements to the buffer requirements for new stream establishment, we define the normalized buffer requirement $B_S(H_i)$ as $$B_S(H_i) = \frac{b_S(H_i)}{2 \cdot b_i}$$

where $b_i$ is the available buffer space at Helper $H_i$. We multiply $b_1$ by two, because the normalized buffer requirement for new stream establishment considers the sum of both available buffer at the source Helper and the receiving Helper.

Network Load

The additional network load caused by sharing a data stream does not solely depend on the source's location and its distance to the joining Helper. Instead, information about group membership and about the location of all the other receivers is necessary to estimate the additional network load. This is illustrated in FIGS. 14A and 14B.

Figure 14A:
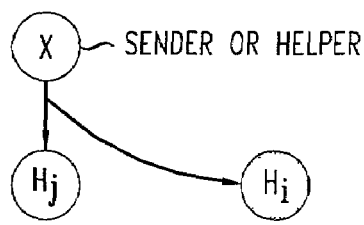
FIGS. 14A and 14B are diagrams useful in assessing network costs for certain stream sharing operations.
Figure 14B:
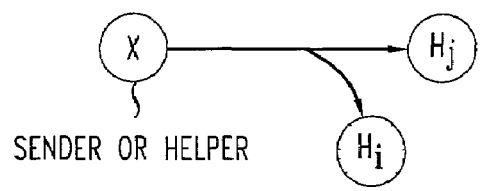

While joining the multicast stream is relatively expensive for Helper $H_i$ in the example of FIG. 14A, it is almost for free in the FIG. 14B scenario. This is because multicast member $H_j$ is located next to $H_i$ in the latter scenario. Therefore, extending the multicast routing tree to include $H_i$ is a relatively low cost operation.

In order to estimate the network cost of joining an existing multicast stream S, Helper $H_i$ advantageously identifies the closest Helper $H_j$ currently receiving or sending data on stream S. All the information required for this purpose is included in advertise messages that are periodically sent by each helper. Knowing the closest member $H_j$ of multicast stream S, the network load factor $N(H_i, S) = N(H_i, H_j)$ is determined as described above.

Summarizing, the network load factor for joining multicast stream S is given by $N(H_i, S) = min \{N(H_i, H_x) | H_x$ is sender or receiver of data stream $S\}$ This factor is used as a measure for the additional network load.

Service time

There is no service time associated with joining an existing multicast stream, because the join process is completely handled by the network. Remote helpers will not be involved in the join process.

Comparison of Alternatives

In general, sharing multicast data streams results in a flat Helper mesh with most buffer allocated at the leaves. Therefore, buffer utilization is not very effective. In particular, buffer use cannot be shared by multiple Helpers, as illustrated in FIG. 15.

Figure 15:
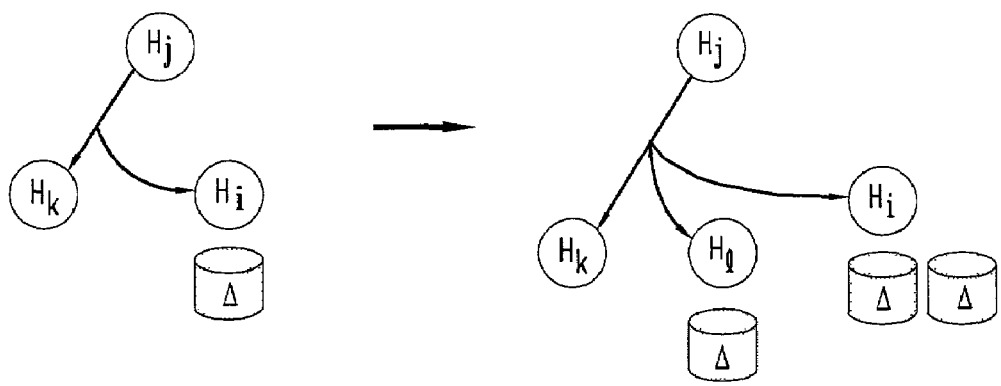
FIG. 15 illustrates an example of buffer allocation at leaves of a multicast tree.

In a first step, late coming Helper $H_i$ joins the already existing multicast stream originating at $H_j$, as shown at the left in FIG. 15. Therefore, sufficient buffer has to be allocated at $H_i$. Later on, Helper $H_l$ also decides to join the same multicast stream (as shown at the right of FIG. 15), thus allocating all the necessary buffer at $H_l$.

Figure 16:
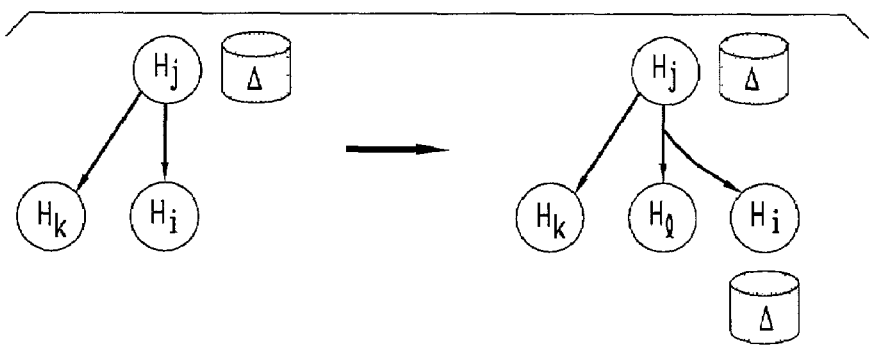
FIG. 16 further illustrates operations involving an exemplary transmitted segment.

In contrast, setting up new data streams leads to the establishment of chains and pipelines allowing multiple Helpers to gain from a single buffer located upstream. If a new data stream S between $H_j$ and $H_i$ is set up in the first step of the above example, all the buffer could be allocated upstream at Helper $H_j$, as shown in FIG. 16.

This allows Helper $H_l$ to make use of the previously allocated buffer at $H_j$ when sharing the multicast stream S. This results in lower aggregate buffer requirements. On the other hand, there are two data streams originating at Helper $H_j$, thus, resulting in an increased system load at $H_j$ and an increased aggregate network load.

A general guideline that is derived from these observations is: Sharing multicast data streams may improve network utilization and decrease system load, though this strategy might be more expensive in terms of buffer requirements. On the other hand, setting up separate data streams for new receivers seems to be preferable with respect to buffer requirements, though it causes additional network and Sender/Helper load. Therefore, it would be highly desirable to have a single parameter allowing dynamic adjustment of the behavior of the system, depending on the index to be optimized. Such a parameter is derived in the following section.

Algorithm for Helper Selection

On receiving a request for a certain continuous media object, Helper H performs the following steps:

1. Access the local Helper table and select the best Helper $H_{new}$ to contact for setting up a new data stream. For this purpose, calculate the cost associated with stream set up for each active Helper. $H_{new}$ will be the Helper with minimal cost $C_{new}$, where $C_{new} = min \{w_B \cdot B_S(H, H_j) + w_N \cdot N(H, H_j) + w_S \cdot S(H_l) | H_j$ is in session$\}$ The parameters $w_B$, $w_N$, and $w_S$ allow to weigh buffer requirements, network load, and service time in different ways. It is also important to keep in mind, that $H_{new}$ could also be the Sender.

At the same time, select the best multicast stream S to join in order to share an existing stream. The best stream is determined by calculating the associated cost for each stream transmitting the requested media object. S will be the stream with minimal cost $C_{share}$ where $$C_{share} = min\{w_B \cdot B_S(H) + w_N \cdot N_S(H) | S \text{ is multicast stream}\}$$

2. Select the better one of both alternatives by comparing their associated costs. If $$C_{new} \leq w \cdot C_{share},$$

then contact Helper $H_{new}$ to set up a new data stream. Otherwise, join multicast stream S. Parameter w allows the definition of preferences for the selection process. If using multicast and sharing data streams is more preferable than setting up new data streams, w should be chosen smaller than 1. Parameter w could dynamically be adjusted to change the system's behavior on the fly.

New stream setup

On receiving a request for new stream set up, a Helper first has to decide whether there are sufficient resources available or not. This requires some kind of admission control (which still needs to be defined). In addition, the Helper has to decide whether the new stream should be unicast or multicast. This decision is typically based on both the hotness of the requested media object and the parameter w. If the requested media object is classified to be "hot", it is likely that more Receivers will request the same object later on. In this case, multicast seems to be preferable. In addition, parameter w is an indicator for the desired system behavior. If w is smaller than 1, multicast is the preferred alternative. Once the decision is made, it must be signaled to the requesting Helper to allow that Helper to join the new multicast group or to receive data via unicast.

Buffer Allocation

Buffer required to absorb the temporal distance will be allocated at the most upstream Helper. If a new stream needs to be set up, we allocate as much buffer as possible at the origin of the new stream. In the case of sharing a multicast stream, all the buffer will obviously be allocated at the joining Helper.

What is claimed is:

1. A network of interconnected helper servers, each comprising
    means for receiving requests for at least portions of continuous media objects from at least one receiver and at least one other of said helping servers,
    means for storing selected first portions of continuous media objects received from at least one source server and others of said helper servers,
    means for selectively forwarding stored portions of continuous media objects to others of said helping servers and receivers requesting at least portions of said continuous media objects,
    wherein said continuous media objects comprise a plurality of ordered segments, and wherein said continuous media objects, and portions thereof, are arranged in serial sequences of said segments,
    wherein each of said helper servers further comprises means for storing other segments of a continuous media object received from a plurality of servers for delivery to a receiver, said plurality of servers being selected from a group of servers comprising others of said helper servers and said at least one source server, and
    wherein each of said helper servers comprises means for receiving advertising messages from others of said helper servers, said advertising messages indicating the availability at respective ones of said other helper servers of segments of an identified continuous media object.

2. A network of interconnected helper servers, each comprising
    means for receiving requests for at least portions of continuous media objects from at least one receiver and at least one other of said helping servers,
    means for storing selected first portions of continuous media objects received from at least one source server and others of said helper servers,
    means for selectively forwarding stored portions of continuous media objects to others of said helping servers and receivers requesting at least portions of said continuous media objects,
    wherein said continuous media objects comprise a plurality of ordered segments, and wherein said continuous media objects, and portions thereof, are arranged in serial sequences of said segments,
    wherein at least one of said helper servers stores an initial segment of at least one continuous media object having a popularity greater than a predetermined threshold popularity.

* * * * *